(12) United States Patent
Boss et al.

(10) Patent No.: US 11,176,215 B2
(45) Date of Patent: Nov. 16, 2021

(54) NAVIGATIONAL NOTIFICATIONS BASED ON FILTERED INTERESTS

(71) Applicant: International Business Machines Corporation, Armonk, NY (US)

(72) Inventors: Gregory J. Boss, Saginaw, MI (US); Michael Bender, Rye Brook, NY (US); Jeremy R. Fox, Georgetown, TX (US); Amit Kapila, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 132 days.

(21) Appl. No.: 16/041,879

(22) Filed: Jul. 23, 2018

(65) Prior Publication Data
US 2020/0026776 A1    Jan. 23, 2020

(51) Int. Cl.
| | | |
|---|---|---|
| *G06F 16/9537* | (2019.01) | |
| *G06F 3/147* | (2006.01) | |
| *G06F 16/248* | (2019.01) | |
| *G06F 16/9535* | (2019.01) | |
| *G06F 16/2457* | (2019.01) | |
| *G06T 3/40* | (2006.01) | |
| *G02B 27/01* | (2006.01) | |

(52) U.S. Cl.
CPC .......... *G06F 16/9537* (2019.01); *G06F 3/147* (2013.01); *G06F 16/248* (2019.01); *G06F 16/24578* (2019.01); *G06F 16/9535* (2019.01); *G06T 3/4092* (2013.01); *G02B 27/0101* (2013.01); *G02B 2027/014* (2013.01)

(58) Field of Classification Search
None
See application file for complete search history.

(56) References Cited

U.S. PATENT DOCUMENTS

| | | | |
|---|---|---|---|
| 9,146,129 B1* | 9/2015 | Furio | G01C 21/3679 |
| 9,602,606 B2 | 3/2017 | Wheatley | |
| 10,609,339 B2* | 3/2020 | Goncalves | H04N 5/272 |
| 2012/0123806 A1 | 5/2012 | Schumann, Jr. et al. | |
| 2012/0190387 A1* | 7/2012 | Redstone | G06Q 10/10 |
| | | | 455/456.3 |
| 2012/0323690 A1 | 12/2012 | Michael | |
| 2013/0290106 A1 | 10/2013 | Bradley et al. | |
| 2014/0108307 A1 | 4/2014 | Raghunathan et al. | |
| 2015/0032366 A1 | 1/2015 | Man et al. | |
| 2016/0174046 A1 | 6/2016 | Wilden et al. | |
| 2016/0269495 A1* | 9/2016 | DeLuca | H04L 67/18 |
| 2016/0360382 A1* | 12/2016 | Gross | G06F 9/453 |
| 2017/0241788 A1 | 8/2017 | Chin et al. | |

(Continued)

*Primary Examiner* — Dawaune A Conyers
(74) *Attorney, Agent, or Firm* — Brian Restauro; Andrew D. Wright; Roberts Calderon Safran & Cole, P.C.

(57) ABSTRACT

In an approach to calculating, filtering and presenting items, one or more computer processors identify a location of a user. The one or more computer processors determine one or more items that are relevant to the user. The one or more computer processors determine whether the user is within a threshold distance of the one or more items. The one or more computer processors calculate one or more weights for each of the one or more items. The one or more computer processors identify a device to present the one or more items. The one or more computer processors present the one or more weighted items based on the capabilities of the identified device.

19 Claims, 4 Drawing Sheets

(56) References Cited

U.S. PATENT DOCUMENTS

2018/0277067 A1* 9/2018 Tentinger ............... G06F 16/29
2019/0306215 A1* 10/2019 Bastide .................. H04L 67/22
2020/0020001 A1* 1/2020 Singh ................. G06Q 30/0205

* cited by examiner

NAVIGATIONAL NOTIFICATIONS BASED ON FILTERED INTERESTS

BACKGROUND

The present invention relates generally to the field of data analysis and more particularly to calculating, filtering and presenting items of interest.

A head-up display or heads-up display, also known as a HUD, is any transparent display that presents data without requiring users to look away from usual viewpoints. A HUD has the advantage that the eyes of the user do not need to refocus to view the external environment after looking at optically nearer objects.

A social networking service is an online service, platform, or site that focuses on facilitating the building of social networks (i.e., web-based community of individuals) or social relations among people that share interests, activities, backgrounds, or real-life connections. A social network consists of a representation of each user (often a profile), associated social links, and a variety of additional services. Most social networks are web-based and provide means for users to interact over the Internet, such as e-mail and instant messaging. Social networks allow users to share ideas, activities, events, and interests within their individual networks. Social networks range from friend-based networks to business social networks as well as internal business networks. Social networks do not focus on a particular topic or niche but emphasize staying connected to friends and connecting to new people. Business social networks focus on interactions and relationships of a business nature rather than including personal, nonbusiness interactions. Users of a business social network maintain a list of business contacts and make new business connections for the purpose of professional networking (e.g., locate a new job, gain resources, etc.).

A map application consists of a geographic information system (GIS) database and a global positioning system (GPS). GIS describes any information system that integrates, stores, edits, analyzes, shares, and displays geographic information. GPS navigation software usually falls into one of the following two categories: navigation with route calculation and directions from the software to the user of the route to take, based on a vector-based map, normally for motorized vehicles, and navigation tracking, often with a map "picture" in the background, but showing where the user has been, and allowing "routes" to be preprogrammed, giving a line the user can follow on a screen.

SUMMARY

Embodiments of the present invention disclose a method, a computer program product, and a system for calculating, filtering and presenting items of interest. The method includes one or more computer processors identifying a location of a user. The one or more computer processors determine one or more items of interest that are relevant to the user. The one or more computer processors determine whether the user is within a threshold distance of the one or more items of interest. The one or more computer processors calculate one or more weights for each of the one or more items of interest. The one or more computer processors identify a device to present the one or more items of interest. The one or more computer processors present the one or more weighted items of interest based on the capabilities of the identified device.

DETAILED DESCRIPTION

When traveling to known locations, users may not need nor desire active route guidance. Typically, users input a destination into a map application and have the application calculate a route. While calculating the route, the application may try to identify general items of interest (e.g., items) along the route for example, gas stations or fast food restaurants. Without active guidance, instances arise in which a user unknowingly passes a multitude of items that are not directly on the route. Moreover, users cannot be made aware of approaching safety concerns or navigational advisories.

Embodiments of the present invention recognize that the information presented on HUD based navigational systems is significantly limited when compared to traditional displays such as smartphone displays. Current HUD implementations in vehicles are constrained to only displaying a speedometer, tachometer or basic navigational directions such as an arrow indicating the impending curvature of the road. Adding additional information causes further distraction to a driver, increasing the instances of improper driving and, ultimately, automotive accidents. Embodiments of the present invention also recognize that if information is not presented in a well-designed interface, driver information overload (DIO) can result. DIO may result from an overly cluttered interface where the presented information conflicts with the view of the external environment.

Embodiments of the present invention recognize that HUD based navigation is improved by generating items of interest based on the location of the user, social network information, and/or news and dynamically modifying the graphical representation of these items displayed on HUDs. Implementation of embodiments of the invention may take a variety of forms, and exemplary implementation details are discussed subsequently with reference to the Figures.

Figure 1:
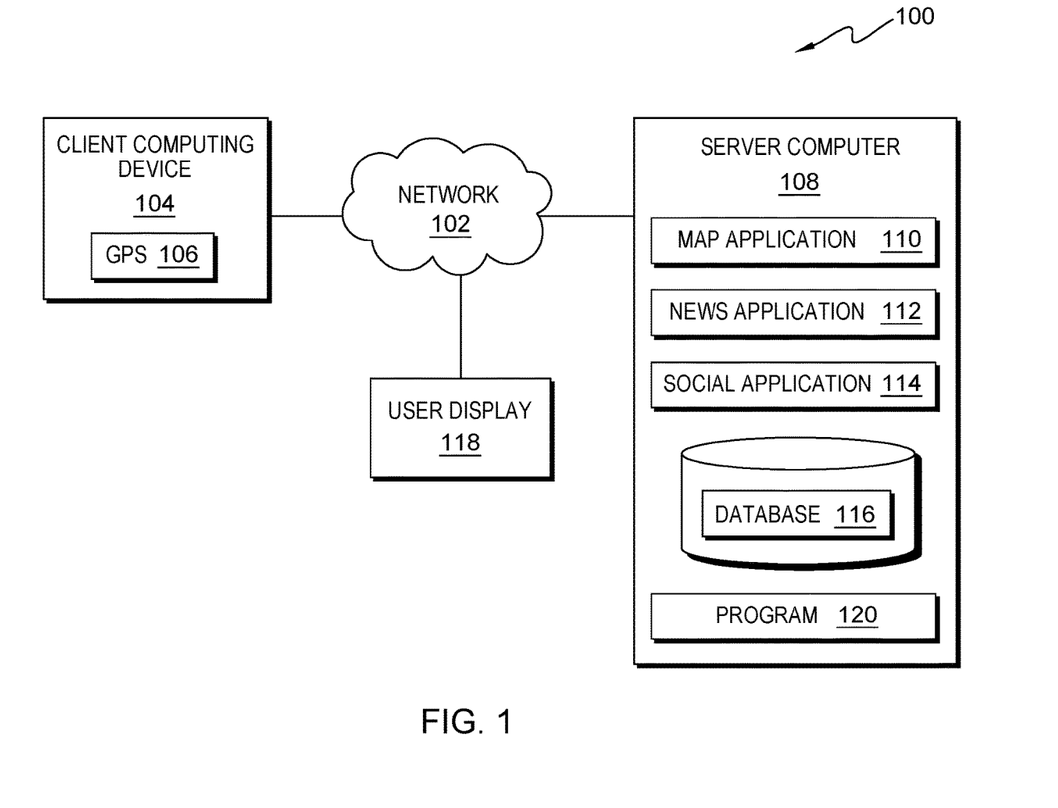
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104, server computer 108, and user display 118, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 104, server computer 108, user display 118, and other computing devices (not shown) within distributed data processing environment 100.

Client computing device 104 can be a laptop computer, a tablet computer, a smart phone, or any programmable electronic device capable of communicating with various components and devices within distributed data processing environment 100, via network 102. In an embodiment, client computing device 104 is an augmented reality (AR) device. In further embodiment, client computing device 104 may be an automotive heads-up display. An automotive heads-up display is any transparent display that presents data in an automobile without requiring users to look away from usual viewpoints. Automotive heads-up displays are useful for allowing drivers to view information with the head positioned "up" and looking forward, instead of angled down looking at lower instruments.

In another embodiment, client computing device 104 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses.

In another embodiment, client computing device 104 may be a smart phone. Smart phones may be used as a telephone, digital camera and video camera, GPS navigation, a media player, clock, news, calculator, web browser, handheld video game player, flashlight, compass, an address book, note-taking, digital messaging, and/or event calendar. In some embodiments, client computing device 104 may be an automobile that is capable of communicating with server computer 108 over network 102. The automobile may have multiple computing devices that make up client computing device 104, some of which include user interfaces and some of which might not. In an example, client computing device 104 is a vehicle with a touch screen that enables the user to view and manipulate objects based on user input. In general, client computing device 104 represents one or more programmable electronic devices or combination of programmable electronic devices capable of executing machine readable program instructions and communicating with other computing devices (not shown) within distributed data processing environment 100 via a network, such as network 102. Client computing device 104 represents one or more devices associated with a user. In the depicted embodiment, client computing device 104 includes GPS 106. Client computing device 104 may include one or more of a plurality of location detection techniques and devices known in the art.

GPS 106 is a device, receiver, or sensor that is capable of receiving information from GPS satellites and calculating the geographical position of the device. In most embodiments, GPS 106 has a track algorithm that combines sets of satellite measurements collected at different times. After a set of measurements are processed, the track algorithm predicts the receiver location corresponding to the next set of satellite measurements. When the new measurements are collected, the receiver uses a weighting scheme to combine the new measurements with the tracker prediction. In general, a tracker can (a) improve receiver position and time accuracy, (b) reject bad measurements, and (c) estimate receiver speed and direction. GPS 106 also transmits information regarding the orientation and speed of the user.

Server computer 108 can be a standalone computing device, a management server, a web server, a mobile computing device, or any other electronic device or computing system capable of receiving, sending, and processing data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any programmable electronic device capable of communicating with client computing device 104 and other computing devices (not shown) within distributed data processing environment 100 via network 102. In another embodiment, server computer 108 represents a computing system utilizing clustered computers and components (e.g., database server computers, application server computers, etc.) that act as a single pool of seamless resources when accessed within distributed data processing environment 100. In the depicted embodiment, server computer 108 includes map application 110, news application 112, social application 114, database 116 and program 120. In other embodiments, server computer 108 may contain other applications, databases, programs, etc. which have not been depicted in distributed data processing environment 100. Server computer 108 may include internal and external hardware components, as depicted and described in further detail with respect to FIG. 4.

In the depicted embodiment, map application 110, news application 112, social application 114 and program 120 are standalone software programs. In another embodiment, the functionality of map application 110, news application 112, social application 114, and program 120, or any combination thereof, may be integrated into a single software program. In some embodiments, map application 110, news application 112, social application 114, and program 120 may be located on separate computing devices (not depicted) but can still communicate over network 102.

Map application 110 is one of a plurality of software programs known in the art for processing navigational information from various computing devices (e.g., 104, 118, or any other device not depicted). In one embodiment, map application 110 includes navigation capability. In some embodiments, map application 110 includes information corresponding to locations on displayed map areas. Map information may include, but is not limited to, an address, a location description, GPS coordinates, or information of relative proximity to another location or object. In the depicted embodiment, map application 110 resides on server computer 108. In another embodiment, map application 110 may reside on client computing device 104. In some embodiments, map application 110 may have a client-based version that sends and receives information with map application 110 which can update map application 110 with a client's location, direction, speed, surroundings, view, orientation, etc. In a further embodiment, map application 110 may reside elsewhere within distributed data processing environment 100 provided that program 120 has access to map application 110.

News application 112 is one of a plurality of software programs known in the art for gathering and processing information from a variety of sources for display. News information may include, but is not limited to, government, education, health, the environment, economy, business, fashion, and entertainment, as well as local events, advertisements, and emergencies. In the depicted embodiment, news application 112 resides on server computer 108. In another embodiment, news application 112 may reside on client computing device 104. In a further embodiment, news application 112 may reside elsewhere within distributed data processing environment 100 provided that program 120 has access to news application 112. In some embodiments, news application 112 may search various websites for information specifically relevant to a user and store the information in a database (e.g., database 116).

Social application 114 is one of a plurality of software programs known in the art for retrieving and processing social network information. Social network information may include, but is not limited to, user shared ideas, activities, events, and interests. In the depicted embodiment, social application 114 resides on server computer 108. In another embodiment, social application 114 may reside on client computing device 104. In a further embodiment, social application 114 may reside elsewhere within distributed data processing environment 100 provided that program 120 has access to social application 114. In some embodiments, social application 114 may search various websites for information specifically relevant to a user and store the information in a database (e.g., database 116). For example, social application may search a social media website for a user's profile to gather information about the user. In other embodiments, social application 114 may be a social media website designated by the user for use by program 120. Social application 114 may not be located on server computer 108, but program 120 may gather information from social application 114.

Database 116 is a repository for data used by GPS 106, map application 110, news application 112, social application 114, and program 120. In the depicted embodiment, database 116 resides on server computer 108. In another embodiment, database 116 may reside on client computing device 104 or elsewhere within distributed data processing environment 100 provided map application 110, news application 112, social application 114, and program 120 have access to database 116. A database is an organized collection of data. Database 116 can be implemented with any type of storage device capable of storing data and configuration files that can be accessed and utilized by program 120, such as a database server, a hard disk drive, or a flash memory. In an embodiment, database 116 stores data used by program 120, such as metadata associated with a location within map application 110, metadata associated with a location of a user, and metadata associated with a user within social application 114. Additionally, database 116 may also store data used by map application 110, including, but not limited to, items on one or more electronic maps. In another embodiment, database 116 may be a geographic information system (GIS) database. In an embodiment, database 116 stores user profiles, user posts, and user "likes" used by social application 114. In an embodiment, database 116 may also store data used by social application 114, including, but not limited to, user specific events, activities, and interests. In another embodiment, database 116 may also store data used by news application 112, including, but not limited to, local activities, events, and emergencies. Additionally, database 116 may also store historical data associated with user responses to previously displayed notifications.

User display 118 provides an output device for the presentation of information processed by program 120, which may be accessed over network 102. A user display, such as user display 118, refers to the medium device that program 120 presents information on (e.g., graphic, text, sound, haptic). A variety of types of user displays exist. In one embodiment, user display 118 is a heads-up display. In another embodiment, user display 118 is combined with client computing device 104. For example, client computing device 104 sends the location of the user to server computer 108, and program 120 presents the determined items on the display of client computing device 104 instead of an external display.

Program 120 combines the functionality of map application 110, news application 112, and social application 114 to provide calculated and filtered points of interest based on the location of the user and present notifications on user display 118. In one embodiment, program 120 is a standalone program. In another embodiment, the function of program 120 may be integrated into map application 110, news application 112 and social application 114 or any combination thereof. In the depicted embodiment, program 120 resides on server computer 108. In another embodiment, program 120 may reside on client computing device 104. In a further embodiment, program 120 may reside elsewhere within distributed data processing environment 100 provided that program 120 has access to map application 110, news application 112, social application 114, and database 116. In some embodiments, program 120 may implement the following steps: receive a location from map application 110 and user social networking information from social application 114; receive local activities, events and general items from news application 112; analyze, calculate and filter potential items; calculate and rank the probability of interest for each filtered point; calculate point notification placement; generate one or more graphical icons to overlay on user display 118. In general, program 120 includes any combination of programs, subprograms, applications, subroutines and/or locations. Program 120 is depicted and described in further detail with respect to FIG. 2.

Figure 2:
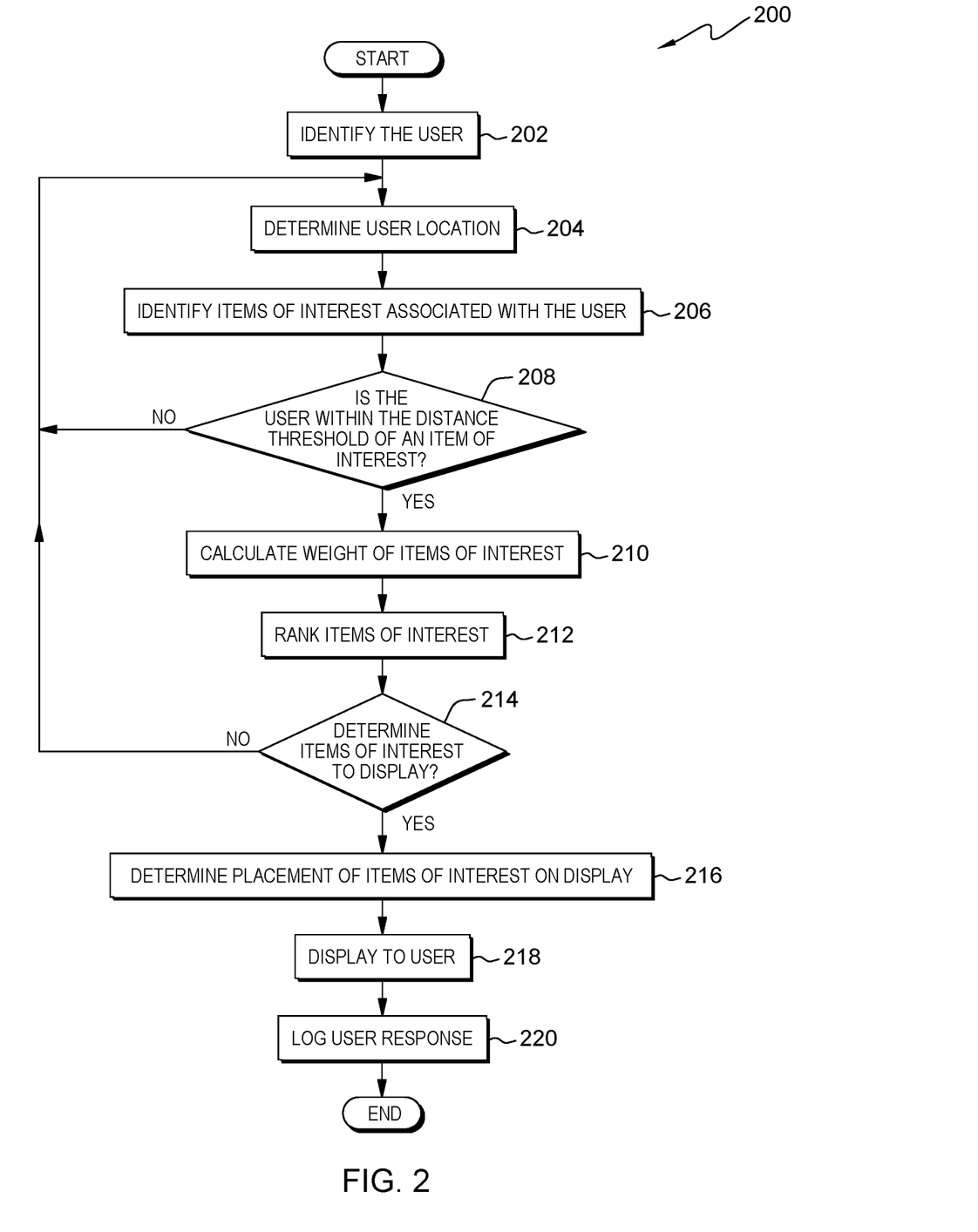
FIG. 2 is a flowchart depicting operational steps of a program, on a server computer within the distributed data processing environment of FIG. 1, for calculating, processing, ranking, and presenting items of interest on user display 118, in accordance with an embodiment of the present invention.

FIG. 2 is a flowchart depicting operational steps of program 120, on server computer 108 within distributed data processing environment 100 of FIG. 1, for calculating, processing, ranking, and presenting items on a user display 118, in accordance with an embodiment of the present invention.

Program 120 identifies the user (step 202). In some embodiments, a user registers client computing device 104 with program 120, associating said device with the user. In other embodiments, program 120 receives a notification a user has entered a vehicle. For example, program 120 receives a notification from a smart device of a user (e.g., client computing device 104) if the user is moving faster than normal walking speed. In another embodiment, program 120 may receive a prompt from a user to begin program 120. In an embodiment, when a user of a computing device (e.g., client computing device 104) enters wireless communication range with a vehicle, program 120 identifies the user of the computing device.

In some embodiments, when client computing device 104 communicates with program 120, program 120 may identify the user associated with registered client computing device 104. For example, a user registers a mobile device, and when the user utilizes the mobile device, program 120 recognizes the user associated with the mobile device. In an embodiment, a user may also link the social network of the user to client computing device 104 and program 120. For example, when the user begins to travel with client computing device 104, program 120 identifies the user and the social networks associated with client computing device 104.

Program 120 determines the user location (step 204). In the depicted embodiment, program 120 receives the location of the user from GPS 106. In an embodiment, program 120 utilizes map application 110 to calculate the map position and street position of the user. In one embodiment, program 120 utilizes map application 110 to determine the specific street address of the user. In another embodiment, program 120 determines the geographic region of the user, such as a city in the United States. For example, while a user is traveling, if program 120 cannot obtain an accurate location, then program 120 presents generalized cardinal directions until a specific location can be determined. In other embodiments, program 120 may utilize mobile phone tracking, via triangulation of radio signals between cell towers. In another embodiment, program 120 may utilize video/image recognition to determine the location of the user. For example, as the user travels, program 120 determines the location of the user by analyzing the video stream from a front facing dashcam to identify street names, buildings, or landmarks. In another embodiment, program 120 may prompt the user to input the location. In some embodiments, program 120 may receive the location via metadata associated with the user's social networking posts and comments.

Program 120 identifies items associated with the user (step 206). In some embodiments, based on the identified user, program 120 retrieves associated social network information. In various embodiments, when the user registers client computing device 104 with program 120, the user may also register social networks of the user. The registered social networks include any network where the user shares interests, activities, backgrounds and/or real-life connections. Program 120 retrieves the social network information including profiles, liked interests, posts, and comments of the user. Program 120 analyzes the social network information using natural language processing techniques (e.g., sentence splitting, tokenization, entity extracting, part-of-speech tagging, chunking, dependency parsing, and anaphora resolution, etc.) to process semantics of the text and determine the interests of the user. In an embodiment, program 120 may retrieve all the user social network posts and tokenize the posts to extract the individual words and phrases. In a further embodiment, program 120 utilizes entity extracting to parse interests such as businesses, hobbies, and/or activities. After program 120 identifies one or more general interests, program 120 utilizes part-of-speech tagging to identify specific interests. For example, a user posts "I love milkshakes" on a social network. In this example, program 120 utilizes natural language processing techniques to extract the words "love" and "milkshakes" and generates an interest. In an embodiment, program 120 may utilize historical responses to place higher importance on certain social networks based on the level of activity of the user. For example, a user links several social networks to program 120 but the user only actively frequents one network. In the described example, program 120 polls and analyzes the active social network more often than the inactive social networks.

In some embodiments, program 120 may create a profile of items associated with the user. Program 120 generates a profile of the user based on past interests, likes, comments, etc., and associates the information with the user. For example, a user likes a comment on social media about a restaurant. Program 120 associates the dish, the name of the restaurant, the type of food the restaurant serves, etc. with the user. Program 120 also tracks the user viewing of an article about a different restaurant that recently opened that serves the same type of food. Additionally, program 120 identifies metadata regarding the time of viewing of the article as well as the time the user liked a comment on social media. Program 120 updates the profile of the user to reflect an interest in the type of food as well as the time of day the user may prefer the type of food. In some embodiments, program 120 may store the profile information of the user in a database (e.g., database 116).

In some embodiments, program 120 retrieves local events, emergencies, and activities within the general region of the user. Program 120 analyzes local and regional news sources for activities and events that are located within a distance radius of the user. In some embodiments, the distance radius is the region or city of the user. In other embodiments, the distance radius is user defined (e.g., 2 miles). In some embodiments, program 120 cross references interests processed from the social networks of the user with the generated user profile, regional events, and/or activities. In other embodiments, program 120 generates a list of potential items via keyword matching. For example, program 120 performs a keyword analysis, pairing user interests with events and activities that share a common set of words and/or categories. In the depicted embodiment, program 120 retrieves the posts and comments of a user and correlates the posts and comments with local and regional activities. For example, if a user frequently posts and comments regarding art, program 120 associates the user with a local art festival. In another embodiment, program 120 retrieves generalized interests not specific to a user but, rather, to users within a region. For example, if the local news reports a flash flood in the region, program 120 can identify the affected streets and areas.

In an embodiment, program 120 is unable to identify the user or is unable to retrieve the social network information for the user. In this embodiment, program 120 would not be able to retrieve the specific profile of the user, nevertheless, program 120 may create a generic profile which incorporates events and activities from other users in the region. For example, if the user begins to travel without linking a social network, then program 120 associates the interests and activities of others in the area to create a generalized profile. This generalized profile may include interests and activities that an average individual in that region may enjoy, for example, a local festival or a new restaurant.

Program 120 determines whether the user is within a distance threshold of an item (decision block 208). Program 120 calculates the relative distance between the user location from step 204 and the location of the potential item from step 206. Program 120 then compares the calculated relative distance with the distance threshold and determines which items are within the distance threshold. In some embodiments, based on the items identified in step 206, program 120 determines whether any items are within a distance threshold of the location of the user. In an embodiment, the distance threshold is predefined by the user. In another embodiment, program 120 defines the distance threshold on a region to region basis. For example, rural regions would have a higher distance threshold to compensate for the greater distances between locations. In yet another embodiment, program 120 may predefine the distance threshold based on the category of the item. For example, items in a restaurant category would have a predefined distance threshold for all items in said category.

In another embodiment, program 120 may modify the distance threshold as a dynamic value based on the social network information of the user. For example, if a user is determined to be highly interested in a specific group or category of restaurants, program 120 increases the distance threshold to account for the high interest. In another embodiment, the distance threshold is based on the historical responses of the user. For example, if the user has been repeatedly presented with the same item and never responded positively, then program 120 decreases the distance threshold, signifying that the user only wants to consider such an item if the item is closer.

If program 120 determines that there are no items within the distance threshold ("no" branch, decision block 208), then program 120 returns to determining user location (step 204). In another embodiment, if program 120 determines there are no items within a specific distance ("no" branch, decision block 208), then program 120 adjusts the threshold distance to encompass a wider radius. Program 120 may continue to increase the threshold distance until at least one item is within a radius of the user and then continue to step 210. The described embodiment may be based on machine learning of a user's preference, past history, user preset, etc.

If program 120 determines that there is at least one item within the distance threshold ("yes" branch, decision block 208), then program 120 calculates a weight for each item (step 210). In various embodiments, program 120 assigns each item within the distance threshold a numerical weight. For example, program 120 calculates the weight as a measure of the probability of user interest, calculated on a scale of 0 to 100 percent. In some embodiments, program 120 weights each item based on a plurality of factors including, but not limited to: distance from the user to the item, time of the day, weather conditions, relevancy to other users in the area, relevancy to the user, and/or historical responses. For example, after many negative user responses, program 120 determines that distance is not a dispositive factor, then program 120 decreases the significance of the distance weight.

In some embodiments, a weight is a numerical value representing the relevance of the social network information to an item. Program 120 may assign a higher numerical weight to items that are related to the social network information of the user. In this embodiment, a numerical value system is used where lower numbers (e.g., one) indicate a lesser weight and higher number (e.g., ten) indicate a greater weight. For example, if a user "likes" or comments about bicycle racing, program 120 increases the weight of items related to bicycle racing or a racing category.

In yet another embodiment, program 120 may calculate multiple different weights for each item. For example, program 120 calculates separate weights based on distance, relevancy, and/or historical responses. In some embodiments, rules or ranges may be predefined such that a particular weight can cause program 120 to increase or decrease the prominence of an item. For example, program 120 adjusts the weight of local emergencies such that emergencies take precedence to all other items. Therefore, the calculated value of an emergency is adjusted to represent a greater value than an item that the user "liked" on a social network post.

In an embodiment, program 120 may incorporate historical user information rules or values which may adjust the weight of an item based on how the user responded to the same or similar items. For example, if a user responded positively to donut related items, then program 120 increases the associated weights of donut related items. In another embodiment, program 120 may influence the weights of items based on distance. For example, program 120 sets lower weights to items that are farther away and, conversely, program 120 sets higher weights to items that are closer.

Program 120 ranks items (step 212). In various embodiments, program 120 applies data analytics to the list of weighted items calculated from step 210. The ranking functions as a priority score for what program 120 determines to be the most relevant to the user. In some embodiments, ranking serves as a probability score for what program 120 determines to be the most probable items that the user may visit. Program 120 may rank the items based on any of the weights calculated including, but not limited to, distance, relevancy, and historical responses to similar items. In some embodiments, program 120 may rank the items based on one factor. In other embodiments, program 120 may rank the items based on a total weight or plurality of factors. For example, program 120 determines that distance and historical responses are the most important factors for a specific user. Here, program 120 ranks the list by combining the two factors. In other embodiments, program 120 may use machine learning techniques to choose from a plurality of factors such as user feedback, weather, current surroundings, and historical trends to rank the list.

Program 120 determines whether there are any items to display (decision block 214). Based on the ranked items, program 120 determines whether any items exceed a threshold by comparing the top ranked items with the threshold amount. In an embodiment, the threshold amount is a predefined value. In another embodiment, the threshold amount is a dynamic value based on a plurality of factors such as the number of items to display. For example, if the items exceed the capabilities of the display, then program 120 increases the threshold to reduce the numbers of items. If program 120 determines that there are no items to display ("no" branch, decision block 214), then program 120 returns to determining user location (step 204). In some embodiments, program 120 may decrease the threshold so that program 120, at least, displays one item.

If program 120 determines that there is at least one item to display ("yes" branch, decision block 214), then program 120 determines the placement of the items to display (step 216). In some embodiments, program 120 can dynamically adjust positioning of items in response to a series of factors including, but not limited to, the location of the user, as well as the dimensions and capabilities of a display (e.g., user display 118). Based on said factors, program 120 adjusts the number, positions, transparency, and presentation method of the items. Program 120 determines the capabilities of a display (e.g., user display 118) and whether the output response should be visual, audio, and/or haptic. In most embodiments, program 120 identifies the device type, display resolution, display size, viewing angles and aspect ratio. For example, program 120 identifies a display that is capable of transmitting audio/video, has a display resolution of 1920 by 1080 pixels and 22-inch display diagonal. Based on the number of items and the dimensions of the display, program 120 can increase or decrease the number of items on the display. Moreover, program 120 can increase or decrease the information presented alongside the items such as cardinal directions or lane suggestions. In some embodiments, program 120 may display a navigational indicator to show the cardinal direction of the item. In another embodiment, program 120 determines the orientation and position of the user in order to calculate the placement of items in relation to the user and to the item location. For example, the user is driving and program 120 identifies an item to the left of the user. Here, program 120 would place the items on the left of user display 118 to indicate that the item is on the left side of the user.

In another embodiment, program 120 may show the distance between the user and the item. For example, if a user is twenty miles away from an item, program 120 displays the distance and dynamically changes the distance as the user moves closer or farther away. In an embodiment, program 120 may split the items into multiple lists based on the orientation of the items in relation to the user. For example, if a set of items are located to the right of the user, program 120 places said items together on the right side of the display as a navigational cue. In some embodiments, program 120 may display items as a list with the highest ranked item being the most prominent item. For example, if a HUD only has the capability to display three items, then program 120 reduces the list down to the top three items where the first item listed corresponds to the highest weighted item.

In yet another embodiment, program 120 may generate one or more graphical icons to be displayed on a HUD. In this embodiment, program 120 may utilize a plurality of factors such as driver position relative to the HUD, user orientation relative to the item, weather conditions, visibility, user speed and the capabilities of the HUD to generate graphical icons of the identified items. For example, in a scenario where a user is driving in heavy rain, program 120 generates icons with a low luminosity reducing the prominence of the icons. In a further embodiment, program 120 determines the level of transparency for the items based on the capabilities of the HUD and the determined position of the icons. For example, program 120 increases the transparency of an icon, allowing the driver to see through the icon, thus not obstructing the view of the driver. In yet another embodiment, program 120 may generate one or more graphical icons to be projected as a virtual image. For example, program 120 projects a virtual image of a graphical icon through the windshield of a vehicle. In this example, the graphical icon would appear to be floating outside the windshield allowing program 120 to place icons directly atop the road. In another embodiment, program 120 generates graphical icons that are to be projected directly on the windshield of a vehicle. In various embodiments, program 120 is determining an interaction of items in relation to a user by audio, visual, haptic feedback, or any combination of the three in response to the position of the user and the surroundings of the user.

Program 120 displays the items to the user (step 218). In some embodiments, in response to determining item placement, program 120 displays the ranked items, via user display 118, in the order, location, and orientation determined by step 216. In one embodiment, program 120 displays the items on a heads-up display. In another embodiment, program 120 displays the items on a wearable computing device. In a further embodiment, program 120 displays the items on a smart phone or tablet device. For example, a user is wearing wearable smart glasses where the items are displayed on the glasses as the user travels. In some embodiments, program 120 may not have a display surface and therefore, program 120 may send navigational auditory instructions to the presentation device. The instructions include, but are not limited to, cardinal directions, distance remaining to an item, and generalized directions (e.g., left at the next light). In other embodiments, program 120 may provide haptic feedback instead of displaying the items on a visual display. In some embodiments, program 120 may display the items on a visual display in addition to audio and haptic feedback. In some embodiments, program 120 may control a device capable of interfacing with a user, but rather program 120 may send instructions to the device which in turn displays or otherwise interacts with a user based on the received instructions.

In some embodiments, program 120 modifies an existing user interface based on the determined "yes" branch of decision block 214. For example, a vehicle has a HUD and program 120 modifies the HUD to include one or more graphical icons. In another example, the HUD is already displaying an icon based upon the previous steps and the orientation of the vehicle and user changes based on the direction of travel. Program 120 modifies the HUD to adjust the location of the icon in relation to the direction of travel. In yet another example, program 120 is already displaying an icon. Program 120 determines another item of higher priority is within a threshold radius and adjusts the HUD to display the higher priority item. In some variations of the previous example, program 120 may move the previous icon to a lower priority position on the display or remove the icon from the display. In various embodiments, a HUD can be substituted for projections on a windshield, or any other interactive interface such as, a smart phone, speakers, holograms, glasses, etc.

Program 120 logs the response of the user (step 220). Program 120 may use one or more techniques of natural language processing (NLP) to log whether the response of the user is positive or negative. If program 120 determines the user responded positively, then program 120 increases the associated historical weight of the item such that the relevance and weights of future related items are increased. If program 120 determines the user responded negatively, then program 120 decreases the associated historical weight of the item such that future related items are weighted lower, reducing the prominence of the items on the display or preventing the items from being displayed. For example, if a user repeatedly responds negatively to a displayed item, program 120 can decrease the historical weight of the item such that program 120 does not display the item in the future. In another embodiment, program 120 may receive the response of the user via a graphical user interface on client computing device 104 (not depicted). For example, after program 120 displays an item, the user can provide feedback for the item on the graphical user interface of client computing device 104. Feedback may include a simple positive or negative response. Feedback may also include detailed responses such as a "would be positive if I had time" response or "if the location was closer I would go" response.

Figure 3:
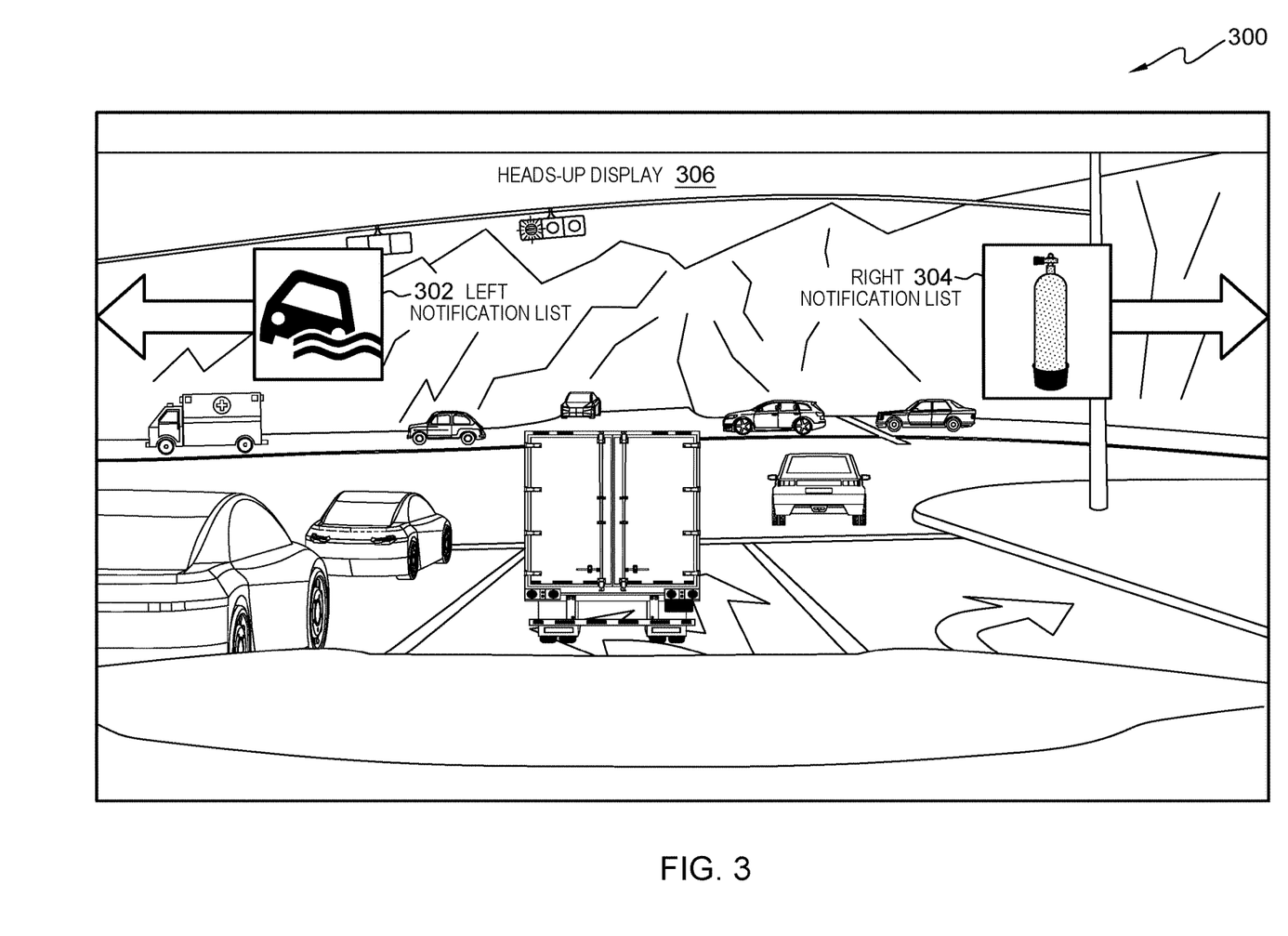
FIG. 3 depicts an example of a vehicle that includes a heads-up display with notifications, in accordance with an embodiment of the present invention.

FIG. 3 depicts example vehicle windshield 300, which is an example illustration of the notifications that program 120 displays in step 218. Example vehicle windshield 300 includes heads-up display 306 integrated into the windshield of a vehicle. Heads-up display 306 includes left notification list 302 and right notification list 304. In this example, left notification list 302 contains a flood advisory warning and right notification list contains an advertisement for a SCUBA store.

In a detailed example of flowchart 200, a user named Emilio utilizes a registered mobile device (i.e., client computing device 104) while traveling by automobile to work. Upon commencement of the trip, the registered mobile device communicates with program 120, identifying that Emilio has entered a vehicle and retrieves Emilio's registered social networking profiles, as discussed in step 202. Emilio frequently posts and comments about his two favorite hobbies: SCUBA diving and estate sales. Program 120 analyzes Emilio's social network information and identifies his hobbies and related interests as discussed in step 206.

While Emilio is in the car, the registered mobile device sends Emilio's current location to server computer 108, as discussed in step 204. Based on Emilio's general location, program 120 analyzes and identifies several items: a local garage sale, a sale on scuba tanks, and the grand opening of a donut shop. As Emilio continues to travel, program 120 compares the distance between Emilio and the items while calculating the weights of the items, as discussed in decision block 208 and step 210. As Emilio nears an item, notifications will appear on the vehicle's windshield (e.g., heads-up display 306), showing a list of items, as discussed in decision block 214 and as depicted in FIG. 3. Program 120 accounts for the heads-up display's dimensions and properties to determine where and when to place the items, as discussed in step 216 and depicted in heads-up display 306. Program 120 presents Emilio with two notifications, as depicted in FIG. 3: one notification is an advertisement in right notification list 304 for a SCUBA shop located to the right of Emilio and the other is a potential flood advisement in left notification list 302 located on the left, as discussed in step 218. As Emilio continues to drive, program 120 replaces the displayed items with higher ranked items. After Emilio has some time to respond to the presented items, program 120 logs the responses for further consideration, as discussed in step 220.

Figure 4:
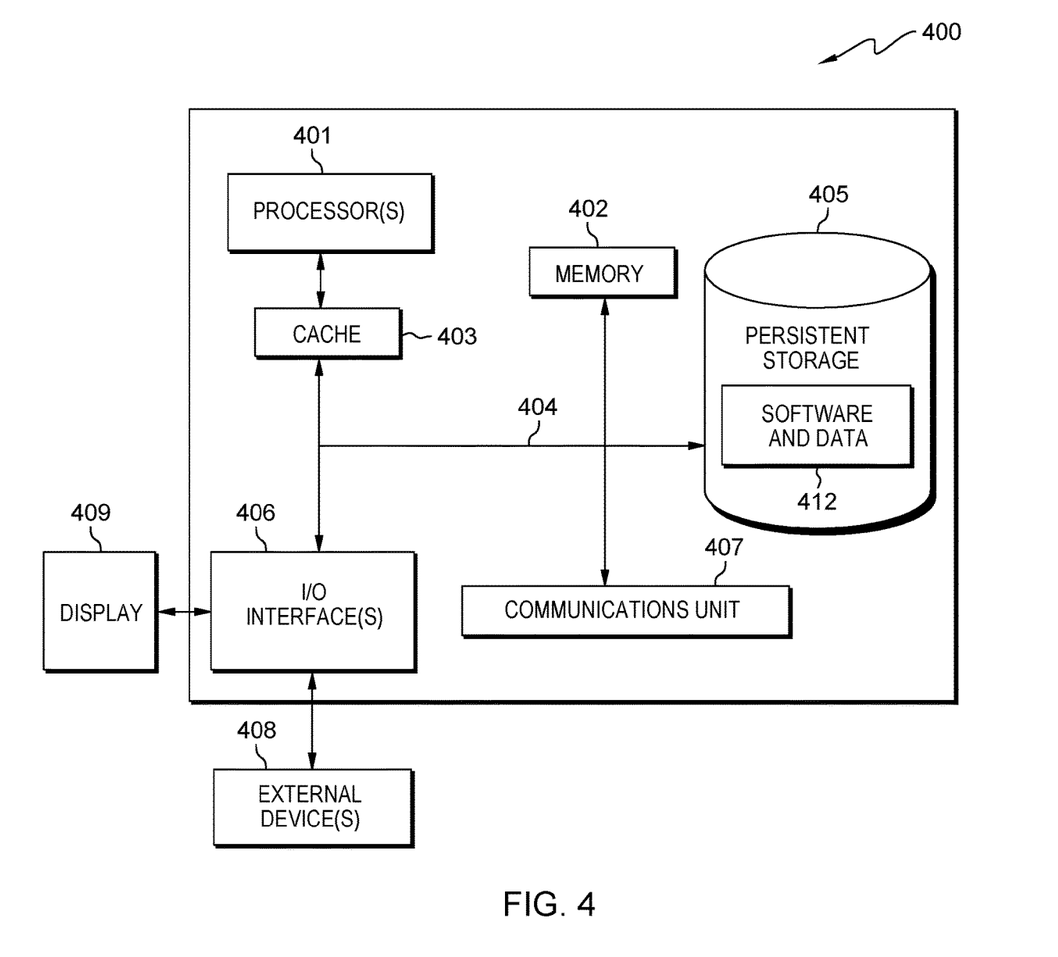
FIG. 4 is a block diagram of components of the server computer executing the program within the distributed data processing environment of FIG. 1, in accordance with an embodiment of the present invention.

FIG. 4 depicts a block diagram of components of server computer 108 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 108 includes communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near accessed data, from memory 402.

Program 120 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 can be stored in persistent storage 405 for access and/or execution by one or more of the respective processors 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 412) used to practice embodiments of the present invention may be downloaded to persistent storage 405 through communications unit 407.

I/O interface(s) 406 allows for input and output of data with other devices that may be connected to server computer 108. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 120, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   determining, by one or more computer processors, one or more items that are relevant to a user and a location of the user;
   determining, by one or more computer processors, whether the one or more determined items are within a threshold distance of the user based on the location of the user, wherein the threshold distance is dynamically modified based on a social network information of the user, user region, and a user response, wherein the user response includes a negative user response to a repeatedly presented item;

responsive to no determined items within the threshold distance, increasing, by one or more computer processors, the threshold distance until at least one item is within the threshold distance;

calculating, by one or more computer processors, one or more weights for each of the one or more items within the threshold distance;

identifying, by one or more computer processors, a device to present the one or more items;

presenting, by one or more computer processors, the one or more items based on one or more capabilities of the identified device and the calculated one or more weights of the one or more items; and responsive to receiving the negative user response for the one or more presented items, decreasing, by one or more computer processors, a respective weight with the one or more presented items reducing the prominence of the one or more presented items on the identified device.

2. The method of claim 1, wherein determining one or more items that are relevant to a user and a location of the user comprises:

identifying, by the one or more computer processors, the user;

acquiring, by the one or more computer processors, social network information associated with the user;

acquiring, by the one or more computer processors, news, based, at least in part, on the location of the user;

acquiring, by the one or more computer processors, historical responses of the user; and determining, by the one or more computer processors, based, at least in part, on the acquired social network information, the acquired news, and the acquired historical response, one or more items relevant to the user.

3. The method of claim 1, wherein calculating, by one or more computer processors, the one or more weights for each of the one or more items includes a relevancy level.

4. The method of claim 3, wherein a computation of the relevancy level is based on at least one of the: distance from user to item, time of day, weather conditions, relevancy to other users in the location, relevancy to social network information of the user, and user historical responses.

5. The method of claim 1, further comprising:

ranking, by the one or more computer processors, the one or more items based on the calculated one or more weights.

6. The method of claim 1, presenting, by one or more computer processors, the weighted one or more items based on the capabilities of the identified device comprises identifying device specifications from the group consisting of device type, screen resolution, screen dimension, viewing angles and aspect ratio.

7. The method of claim 1, wherein presenting, by one or more computer processors, the weighted one or more items comprising:

determining, by one or more computer processors, the orientation of the user relative to the identified one or more items;

determining, by one or more computer processors, the location of the user relative to the device; and presenting, by one or more computer processors, the items based, at least in part, on the orientation and location of the user in relation to the location of the identified one or more items.

8. The method of claim 1, wherein presenting, by one or more computer processors, the weighted one or more items comprising:

identifying, by the one or more computer processors, a size and resolution of the device;

adjusting, by the one or more computer processors, a size of the one or more items based on the identified size of the device;

adjusting, by the one or more computer processors, a transparency of the items based on the identified resolution of the device; and presenting, by the one or more computer processors, the adjusted one or more items based, at least in part, on the resolution and size of the device.

9. The method of claim 1, wherein the device is a heads-up display.

10. The method of claim 1, further comprising logging, by the one or more computer processors, a response of the user to the presented weighted items.

11. A computer program product comprising:

one or more computer readable storage media and program instructions stored on the one or more computer readable storage media, the program instructions comprising:

program instructions to determine one or more items that are relevant to a user and a location of the user;

program instructions to determine whether the one or more determined items are within a threshold distance of the user based on the location of the user, wherein the threshold distance is dynamically modified based on a social network information of the user, user region, and a user response, wherein the user response includes a negative user response to a repeatedly presented item;

program instructions to, responsive to no determined items within the threshold distance, increase the threshold distance until at least one item is within the threshold distance;

program instructions to calculate one or more weights for each of the one or more items within the threshold distance;

program instructions to identify a device to present the one or more items;

program instructions to present one or more items based on the capabilities of the identified device and the calculated one or more weights of the one or more items; and program instructions to, responsive to receiving the negative user response for the one or more presented items, decrease a respective weight with the one or more presented items reducing the prominence of the one or more presented items on the identified device.

12. The computer program product of claim 11, wherein determining one or more items that are relevant to a user and a location of the user comprises program instructions to:

identify the user;

acquire social network information associated with the user;

acquire news, based, at least in part, on the location of the user;

acquire historical responses of the user; and determine based, at least in part, on the acquired social network information, the acquired news, and the acquired historical response, one or more items relevant to the user.

13. The computer program product of claim 11, further comprising program instructions to:
present the weighted one or more items based on the capabilities of the identified device comprises identifying device specifications from the group consisting of device type, screen resolution, screen dimension, viewing angles and aspect ratio.

14. The computer program product of claim 11, wherein presenting the weighted one or more items comprises program instructions to:
determine the orientation of the user relative to the items;
determine the location of the user relative to the device; and
present the items based, at least in part, on the orientation and location of the user.

15. The computer program product of claim 11, wherein presenting the weighted one or more items comprises program instructions to:
identify a size and resolution of the device;
adjust a size of the presented items;
adjust a transparency of the presented items; and
present the adjusted items based, at least in part, on the resolution and size of the device.

16. A computer system comprising:
one or more computer processors;
one or more computer readable storage media; and
program instructions stored on the computer readable storage media for execution by at least one of the one or more processors, the program instructions comprising:
program instructions to determine one or more items that are relevant to a user and a location of the user;
program instructions to determine whether the one or more determined items are within a threshold distance of the user based on the location of the user, wherein the threshold distance is dynamically modified based on a social network information of the user, user region, and a user response, wherein the user response includes a negative user response to a repeatedly presented item;
program instructions to, responsive to no determined items within the threshold distance, increase the threshold distance until at least one item is within the threshold distance;
program instructions to calculate one or more weights for each of the one or more items within the threshold distance;
program instructions to identify a device to present the one or more items;
program instructions to present one or more items based on the capabilities of the identified device and the calculated one or more weights of the one or more items; and
program instructions to, responsive to receiving the negative user response for the one or more presented items, decrease a respective weight with the one or more presented items reducing the prominence of the one or more presented items on the identified device.

17. The computer system of claim 16, wherein determining one or more items that are relevant to a user and a location of the user comprises program instructions to:
identify the user;
acquire social network information associated with the user;
acquire news, based, at least in part, on the location of the user;
acquire historical responses of the user; and
determine based, at least in part, on the acquired social network information, the acquired news, and the acquired historical response, one or more items relevant to the user.

18. The computer system of claim 16, wherein presenting the weighted one or more items comprises program instructions to:
determine the orientation of the user relative to the items;
determine the location of the user relative to the device; and
present the items based, at least in part, on the orientation and location of the user.

19. The computer system of claim 16, wherein presenting the weighted one or more items comprises program instructions to:
identify a size and resolution of the device;
adjust a size of the presented items;
adjust a transparency of the presented items; and
present the adjusted items based, at least in part, on the resolution and size of the device.

* * * * *